United States Patent
John et al.

(10) Patent No.: US 9,991,604 B2
(45) Date of Patent: Jun. 5, 2018

(54) RADAR SENSOR WITH ABSORBER AND A METHOD FOR INSTALLING THE ABSORBER

(71) Applicant: Hella KGaA Hueck & Co., Lippstadt (DE)

(72) Inventors: Andreas John, Lippstadt (DE); Dietmar Philipp, Erwitte (DE)

(73) Assignee: Hella KGaA Hueck & Co., Lippstadt (DE)

( * ) Notice: Subject to any disclaimer, the term of this patent is extended or adjusted under 35 U.S.C. 154(b) by 185 days.

(21) Appl. No.: 14/685,122

(22) Filed: Apr. 13, 2015

(65) Prior Publication Data
US 2016/0322712 A1 Nov. 3, 2016

(30) Foreign Application Priority Data
Apr. 14, 2014 (DE) .................. 10 2014 105 272

(51) Int. Cl.
| | |
|---|---|
| *G01S 13/93* | (2006.01) |
| *H01Q 17/00* | (2006.01) |
| *G01S 7/03* | (2006.01) |
| *H01Q 1/32* | (2006.01) |
| *H01Q 1/42* | (2006.01) |
| *B29C 45/26* | (2006.01) |
| *B29C 65/48* | (2006.01) |
| *G01S 7/02* | (2006.01) |
| *B29L 31/34* | (2006.01) |

(52) U.S. Cl.
CPC ....... *H01Q 17/008* (2013.01); *B29C 45/2626* (2013.01); *B29C 65/4805* (2013.01); *G01S 7/03* (2013.01); *H01Q 1/3233* (2013.01); *H01Q 1/42* (2013.01); *H01Q 17/00* (2013.01); *B29K 2995/0003* (2013.01); *B29L 2031/34* (2013.01); *G01S 2007/027* (2013.01)

(58) Field of Classification Search
CPC ................................ H01Q 17/008; G01S 7/03
USPC ......................................................... 342/1–4
See application file for complete search history.

(56) References Cited

U.S. PATENT DOCUMENTS

| | | | |
|---|---|---|---|
| 5,955,752 A | 9/1999 | Fukaya et al. | |
| 7,136,008 B2 * | 11/2006 | Aisenbrey | B29C 70/58 342/4 |
| 7,695,803 B2 * | 4/2010 | Kasabo | B32B 29/08 428/182 |
| 8,564,472 B2 * | 10/2013 | Okamura | H01Q 1/526 342/1 |
| 8,598,470 B2 * | 12/2013 | Kagawa | B32B 3/30 174/386 |
| 2002/0138214 A1 * | 9/2002 | Hyvarinen | F21V 9/00 702/40 |
| 2005/0001757 A1 * | 1/2005 | Shinoda | H01Q 1/3233 342/70 |
| 2005/0128134 A1 * | 6/2005 | Shinoda | H01Q 1/3233 342/70 |
| 2007/0241962 A1 | 10/2007 | Shinoda et al. | |

(Continued)

*Primary Examiner* — Marcus E Windrich
(74) *Attorney, Agent, or Firm* — Husch Blackwell LLP

(57) ABSTRACT

A radar sensor for emitting and/or receiving wave-shaped electromagnetic signals, having at least one housing and at least one absorber. The absorber is disposed inside the housing and a surface of the absorber has raised rib-like sections which are disposed adjacently to one another on the surface of the absorber. The absorber is an injection molded component.

7 Claims, 2 Drawing Sheets

(56) References Cited

U.S. PATENT DOCUMENTS

| | | | |
|---|---|---|---|
| 2008/0266830 A1* | 10/2008 | Woods | H01L 23/552 361/818 |
| 2009/0015456 A1* | 1/2009 | Moore | H01Q 1/526 342/4 |
| 2012/0119932 A1* | 5/2012 | MacDonald | H01Q 1/425 342/1 |
| 2012/0133547 A1* | 5/2012 | MacDonald | G01S 13/931 342/70 |

* cited by examiner

RADAR SENSOR WITH ABSORBER AND A METHOD FOR INSTALLING THE ABSORBER

CROSS REFERENCE

This application claims priority to German Application No. 10 2014 105272.2, filed Apr. 14, 2014, which is hereby incorporated by reference.

FIELD OF TECHNOLOGY

The invention relates to a radar sensor for emitting and/or receiving wave-shaped electromagnetic signals, having at least one housing and at least one absorber, wherein the absorber is disposed inside the housing. The invention also relates to a method in this regard, for the installation of such a radar sensor.

BACKGROUND

Aside from the actual electromagnetic desired signals, which are used, for example, for measuring distances, interference signals also arise in radar sensors, such as HF-interference signals, in particular. These interference signals can have a negative effect on the quality of the measurement of the desired signals, by means of which measuring errors, or at least defective measurements, may occur. In order to reduce the effect of the interference signals, internal shielding measures are normally provided. These absorb the interference signals, or shield at least the measurement systems and/or the transmission means from the effects of the interference signal.

These include, for example, metallic shields, which primarily result in a reflection of the interference signals. In addition to the metallic shields, radar-absorbing materials are used, which receive the interference signals prior to or after a reflection, and preferably absorb said signals entirely.

Radar absorbing elements are known in the prior art, which are formed from special, filled elastomer foams and/or from plastic foams. These foams are available on the market in the form of solids, as self-adhesive mats, which can be cut to size, in accordance with the respective application, and can be placed in the radar sensors, or can be placed on the radar sensors.

The disadvantage with the solution in the prior art is, in particular, that the installation of the foam mats, cut to size, normally occurs manually thereby. The foam mats are also normally produced from standardized materials, whereby a specific adaptation of the absorbent properties and the height geometries on an individual basis is not possible, or is only possible with great difficulty. Furthermore, small conductive particles arise during the cutting of the foam mats to size, in particular at the edges of the cuts, which can detach from the elements cut to size, which can lead to risks in terms of quality, both during the production, as well as later, in the fully assembled radar sensor. Furthermore, an automated installation of the tailored element is not possible.

Rubber-like flat absorbers are also known, which display a narrower band effect at higher costs and display disadvantages with an automated processing of the cutting to size.

SUMMARY OF THE INVENTION

Based on the foregoing, the object of the present invention is to provide a radar sensor with an absorber, wherein the absorber can be produced in a simple manner, and can preferably be produced and installed in an automated process. For this, it should be possible, in a particularly simple manner, to adapt the absorber to the radar sensor. Furthermore, it is the object of the invention to provide a method for the installation of the absorber in and/or on the radar sensor.

One embodiment example of the invention relates to a radar sensor for emitting and/or receiving wave-shaped electromagnetic signals, having at least one absorber and having at least one housing, wherein the absorber is disposed inside the housing, wherein a surface of the absorber exhibits structures, such as a raised rib-like section, in which said ribs are disposed adjacent to one another on the surface of the absorber, wherein the absorber is an injection molded component. The absorber is preferably manufactured thereby from a material having absorbing properties. The structures can advantageously also be adapted, in terms of its height profile, to other sensor components.

An absorber manufactured as an injection molded component is particularly advantageous, because it can be produced from numerous individual materials that can be combined. The material can be particularly well coordinated to the application purpose thereby. The generation of the absorber by means of an injection molding process is furthermore advantageous for generating an absorber that precisely fits, with respect to the dimensions, the housing for the radar sensor. It is particularly advantageous that the injection molded component no longer requires any further processing, and no further cutting must be carried out for the fitting. The injection molding furthermore enables the generation of a very precisely fitted element, subjected to only very small tolerances. Thus, the absorber can be particularly well adapted to the respective receiving area in the radar sensor.

Furthermore, absorbers in the form of injection molded components also exhibit the advantage that both custom-made parts, as well as mass-produced parts can be manufactured with injection molding processes. In particular, the quality and the precision sizing are advantageous thereby, for obtaining an optimal absorption result in or on the radar sensor of the highest possible quality.

The absorber is preferably made of a plastic. Plastic components can be produced particularly easily, and can be readily further processed. In particular, plastic components can be processed in the framework of an automated installation in a simple manner, by means of which a simplification of the installation process can be achieved through automation. The absorbers can be removed from a material supply package by means of an automated gripper device, for example, for this purpose. Optionally, it is also possible to provide the material in bulk form to the automated gripper, via a separating device.

The radar sensor preferably has a transmitter unit and/or a receiver unit, which is able to transmit and/or receive radar signals. Furthermore, the radar sensor has a housing, which accommodates the transmitter unit and/or receiver unit. Moreover, a control unit may be provided.

It is also advantageous when the absorber is disposed inside the radar sensor. It is particularly advantageous when the absorber, which is produced as an injection molded component, is disposed inside the radar sensor, because the absorber is of high quality, and displays a particularly high degree of stability in terms of its shape, such that a partial delamination of the materials does not occur, by means of which the radar sensor could become contaminated or damaged.

Furthermore, it may be advantageous when the radar sensor has a receiving area, which is bordered by an at least partially encompassing border region, wherein the absorber can be inserted in the receiving area with a precise fit.

The at least partially encompassing border region can preferably be formed by a ledge running on a surface. It is particularly advantageous thereby, when the play between the receiving area and the absorber is as small as possible. This can preferably be achieved by an absorber in the form of an injection molded component, because with the injection molding, particularly small tolerances can be obtained. With less play between the absorber and the receiving area, there are fewer interference signals passing by the absorber, and thus, the negative effect on the radar sensor is reduced.

It may also be advantageous when the raised rib-like sections form a wave-shaped pattern on the surface of the absorber, wherein the height of the waves between adjacently disposed wave peaks and wave troughs is variable along the course of the pattern.

The height of the waves, thus the extension of the raised rib-like sections in the direction of extension in which the thickness of the absorber is measured, can vary over the course of the plate-like extension of the absorber. Thus, the absorber can be adapted, in particular, to the respective interference signals that are to be expected, in order to obtain an optimal result to the greatest possible extent. Aside from the height of the waves, the spacing of the wave peaks and/or wave troughs to one another, in particular, or the widths of the wave peaks and/or wave troughs, can be varied. In this manner, an absorber can be generated, which enables an optimal absorption of the interference signals at each point.

Furthermore, it may be particularly advantageous when the wave-shaped pattern has straight raised rib-like sections, which run parallel to one another. This is particularly advantageous for obtaining an advantageous rib structure for the absorption of interference signals.

It is particularly advantageous when the absorber is formed by a plate-shaped element, wherein the raised rib-like sections extend upward from the plate-shaped element, in a direction along a surface normal on the plate-shaped element. This is particularly advantageous for obtaining high absorption properties. By means of the rib-like sections, structures are generated that promote absorption.

In an alternative design, the absorber can out exhibit a design deviating from a plate-like extension, and in particular, can exhibit a three-dimensional structure. The absorber can preferably be adapted to the respective receiving area thereby. With a more complex three-dimensional structure, the absorber can be placed, for example, on a plurality of walls, disposed at an angle to one another, in a precise fit. As a result, a larger region of the housing can be fully furnished with fewer absorbers. By using an injection molding process, the absorbers can be particularly advantageously adapted to the respective geometry of the housing that is to be furnished therewith, by means of which an improved absorption can be achieved in the radar sensor.

One preferred embodiment example is characterized in that the absorber exhibits a variable thickness along the course of the plate-shaped expansion.

This is particularly advantageous for adapting the absorber to the greatest possible extent to the receiving area in the radar sensor. Furthermore, an impact on the absorption properties of the absorber can be achieved by means of a greater or lesser thickness, by means of which a more precise adaptation of the absorber can be obtained.

Furthermore, it is useful when the raised rib-like sections that are adjacent to one another exhibit a herringbone pattern. A herringbone pattern is particularly advantageous for absorbing the largest possible portion of the interference signals.

The raised rib-like sections can preferably have a triangular shaped cross-section. As a result, a wave trough with a V-shaped cross-section is generated, which is particularly well suited to absorbing interference signals, because the high-frequency waves entering the wave troughs are tossed back and forth between the flanks of the two adjacent wave peaks that are facing each other, and thus more strongly absorbed. In alternative designs, the wave troughs and/or wave peaks can also exhibit a rectangular or rounded cross-section.

It is also preferred when the absorber and/or the receiving area has a spacer, wherein the absorber can be positioned in relation to the receiving area by means of the spacer along an insertion direction and/or in a direction transverse to the insertion direction.

A spacer is particularly advantageous for obtaining a precise positioning of the absorber in the receiving area. This is advantageous in particular with regard to an automated installation method. The spacer also ensures that a uniform coating thickness of the adhesive is obtained on the absorber, by means of which a greater bonding quality can be obtained.

It is also advantageous when the absorber is designed for absorbing high-frequency waves, wherein high-frequency waves have a frequency of 10 GHz or more. Advantageously, the absorbers are suitable for absorbing interference signals in the frequency range of the transmitted radar signals. The radar signals normally exhibit a frequency in the range of 24 GHz or 77 GHz. Depending on the radar signal that is being used, the absorber can also be specifically adapted to one or more frequency ranges. This can be achieved by a suitable material selection and/or by an adaptation of the geometry. In particular, the raised rib-like sections are adapted thereby.

One embodiment example of the invention relates to a method for the installation of an absorber in a radar sensor, wherein an adhesive is applied to the absorber, and subsequently, the absorber is placed by automated means in the receiving area of the radar sensor, wherein spacers on the absorber and/or the receiving area generate a positioning of the absorber in relation to the receiving area, and furthermore, generate a constant coating thickness of the adhesive applied thereto. Preferably, the adhesive can be applied in the receiving area of the radar sensor, and subsequently, the absorber can be inserted therein.

One method for the automated application of adhesive and the automated installation of the absorber is particularly advantageous in terms of enabling an inexpensive and quick installation. The installation quality can also be improved by an automated method, because, in particular, the positioning of the absorber can be improved, by means of which the passing of interference signals past the absorber can be reduced. For the application of the adhesive, a single-axis dispenser can preferably be used.

The curing of the adhesive can occur, particularly preferably, during the subsequent final assembly of the radar sensor, by means of which the installation process is further improved.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
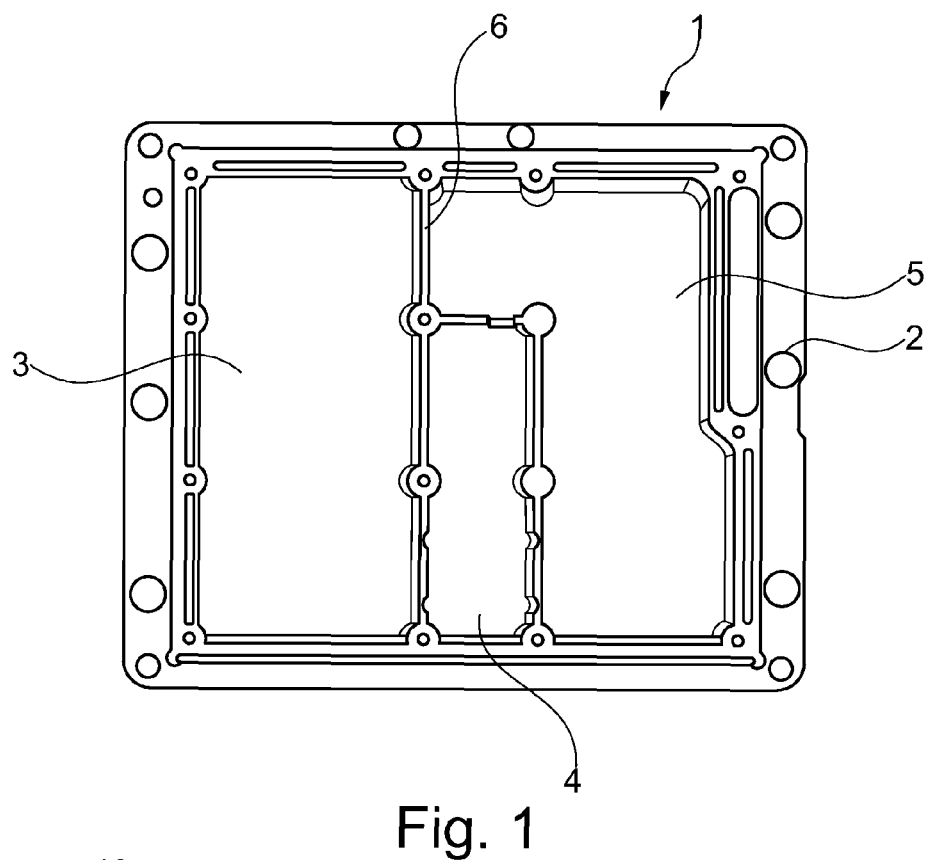
FIG. 1 shows a view of a housing for a radar sensor, as known from the prior art, wherein a self-adhesive absorber is disposed in the housing, wherein the absorber is cut from a standard material in the form of a mat.

FIG. 1 shows a view of a radar sensor 1 as it is used in the prior art. The radar sensor 1 has, aside from a not shown sensor unit, in particular, a housing 2, which closes the radar sensor 1 to the exterior.

The housing 2 has, furthermore, numerous receiving areas 5, in which an individual absorber 3, 4, respectively, is inserted. Absorbers 3, 4 are placed in each of the two left receiving areas 5, which are preferably formed by self-adhesive foam mats. The shown absorbers 3, 4 are normally cut manually thereby from mat elements, which are produced from standard materials. The absorbers 3, 4 are self-adhesive in the solutions in the prior art, and can be inserted in the respective receiving areas thereby.

The receiving areas 5 are each bordered by edges 6 in the directions transverse to the direction of insertion. The absorbers 3, 4 are normally cut to fit precisely to the contours of the receiving areas 5. The radar sensor 1 shown in FIG. 1 corresponds to the typical construction for radar sensors in the prior art. The absorbers 3, 4 are disposed on an exterior surface of the radar sensor 1 thereby.

In alternative known embodiments, instead of using the absorbers made of foam, absorber films can also be used, which are self-adhesive, and bonded to the housing for the radar sensors.

Figure 2:
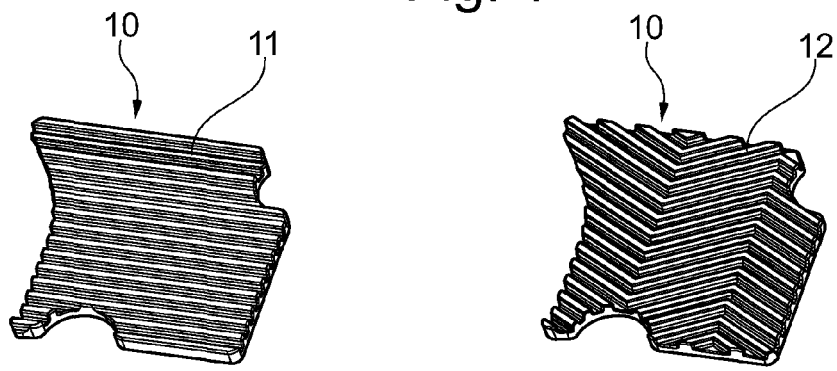
FIG. 2 shows a view of three different absorbers, wherein the absorbers are designed as injection molded components, and have a rib-like structure on one surface, wherein an absorber with straight raised rib-like sections, which are disposed parallel to one another, is shown on the left, and an absorber with raised rib-like sections, which form a herringbone pattern, is shown in the middle, and an absorber having additional regions of different thicknesses is shown on the right.
Figure 2:
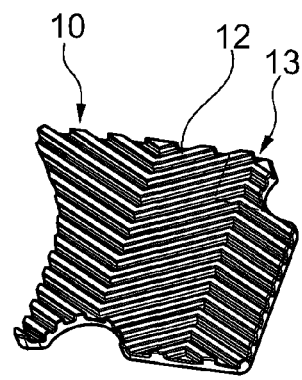

FIG. 2 shows, in each case, three views disposed next to one another, of an absorber 10. The absorber 10 is designed as an injection molded component thereby, and already adapted to its final shape, accordingly, in the production thereof. This means that both the outer contours of the absorber 10 as well as the surface structure, as well as the thickness of the absorber 10, including the possible height profiles 10, are already defined in the production process.

The three absorbers 10, disposed adjacent to one another, are each formed by a plate-like element, the two main directions of extension thereof being in one plane. The third direction of extension for the absorber 10 forms the thickness thereof, which is smaller in comparison with the two other main directions of extension. The absorbers 10 have numerous straight exterior edges, and numerous curved cut-outs. The outer contour of the absorber 10 is adapted thereby, in particular, to the geometry of the respective receiving area on the radar sensor in which the absorber 10 is inserted.

The left absorber 10 has numerous raised rib-like sections 11, which form straight structures disposed parallel to one another. In this manner, a rib structure is formed on the surface of the absorber 10, in which, in particular in its spacing of the individual raised sections 11 to one another, the height of the raised sections 11 as well as the width of the raised sections 11 are adapted specifically to the respective interference signals that are to be absorbed, which are present in a wave-shaped form.

By means of a simple adjustment of the production process, the absorber can thus be adapted to different interference signals with little effort, and furthermore, can be adapted to different receiving areas inside the radar sensors. The absorbers 10 shown in FIG. 2 are provided, in particular, for use inside the housing of a radar sensor, in order to absorb the interference signals, in particular in the region of the sensor unit.

The middle absorber 10 has, in differing from the absorber 10 depicted on the left, raised rib-like sections 12, which form a rib-like herringbone pattern along the surface of the absorber 10. The individual raised rib-like sections 12 are likewise disposed adjacent to one another such that they are parallel, by means of which a wave structure is generated on the surface of the absorber 10. As with the left embodiment example of the absorber 10, the height, thickness, and spacing of the raised rib-like sections 12 can be varied in relation to one another, in order to absorb specific frequencies of the interference signals in a targeted manner.

Another depiction of an absorber 10 is shown in the right portion of FIG. 2. This likewise has raised rib-like sections 12 on its surface, which, like the absorber 10 in the central region, form a herringbone pattern. Furthermore, the absorber 10 has a region having a smaller thickness 13 at the upper right end region.

The right portion of FIG. 2 shows an embodiment example having a specifically adapted geometry of the absorber 10. The region having a smaller thickness 13 is separated thereby, by a sharp-edged stepped course, from the remaining region of the absorber 10. In alternative embodiments, continuous thickness increases and thickness decreases can also be provided. Likewise, a change in the uniform rib structure can be provided along the surface of the absorber. In this manner, by way of example, differently shaped rib-like structures can also be provided, for example, in circular configurations, or in wave-shaped configurations.

The absorbers in FIG. 2 form, in particular with regard to the outer contour of the respective absorber 10, an exemplary design, and furthermore, do not limit the shape of the absorber 10.

Figure 3:
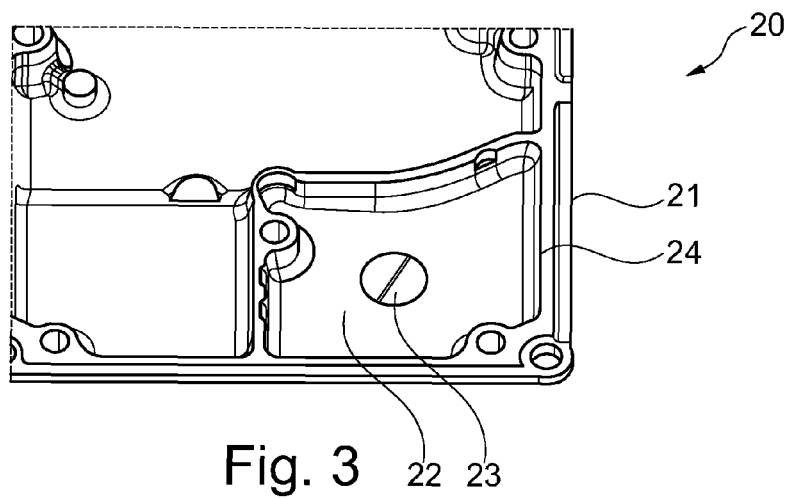
FIG. 3 shows a view of a housing for a radar sensor, wherein a receiving area is formed, which is bordered by an encompassing edge.

FIG. 3 shows a view of a radar sensor 20 with a housing 21. The housing 21 has numerous receiving areas 22, in each of which absorbers can be inserted, as described in reference to the preceding figures. The lower right receiving area 22 has, by way of example, a spacer 23, which serves to space the absorber apart from the flat floor region of the receiving area 22. The spacer 23 ensures thereby, in particular, that a defined spacing between the housing 21 and the absorber is maintained in the final installation state, by means of which, in particular, the adhesive layer, which is applied to the back surface of the absorber for installation purposes, is of a defined thickness.

The receiving area 22 is bordered in the directions transverse to the insertion direction by an encompassing edge 24.

Preferably, the absorber is precisely adapted to the shape of the receiving area 22, with only very small tolerances. This should prevent, in particular, the formation of appreciable gaps between the absorber and the edge 23, which would reduce the absorption properties on the whole.

As can be seen in FIG. 3, the receiving area 22 has a specific outer contour, which has, by way of example, sections for threads provided in the housing 21, by means of which, in particular, the absorber must likewise have an outer contour adapted thereto, in order to be able to be precisely inserted into the receiving area.

Figure 4:
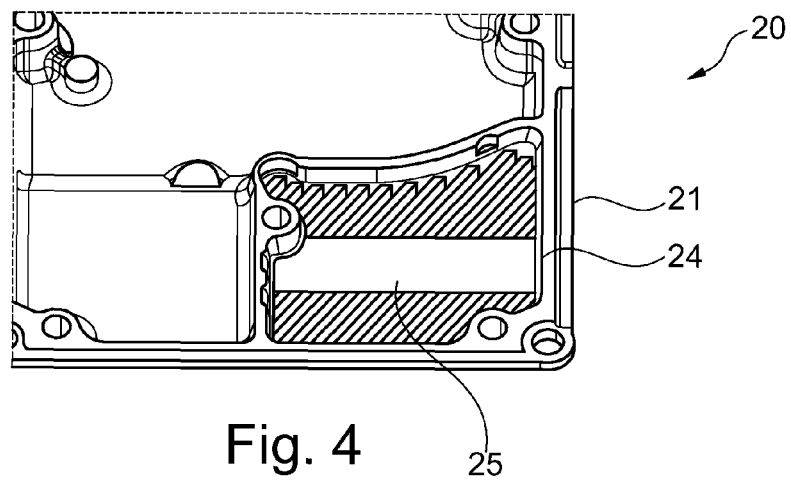
FIG. 4 shows another view of the housing according to FIG. 3, wherein an absorber corresponding to that in FIG. 2 is inserted in the receiving area.

FIG. 4 shows a view of the housing 21 for the radar sensor 20, wherein an absorber 25 is inserted in the receiving area 22 thereof. The absorber corresponds thereby, substantially, to the absorbers 10 already shown in FIG. 2. Because of the precise shape of the absorber 25, it can be inserted in the receiving area 21 such that it is flush with the edge 24.

Figure 5:
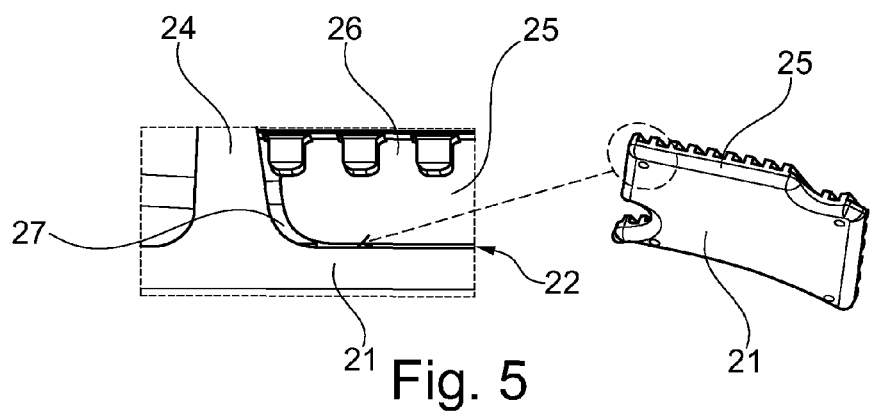
FIG. 5 shows a sectional view, cut through the housing, with an absorber according to FIG. 4 inserted therein, wherein the absorber is spaced apart from the housing by at least one spacer.

FIG. 5 shows a view of a housing 21 having an absorber 25 inserted therein, in the right region of the figure. In the left region, a sectional view is shown, cut through the absorber 25 and the housing 21. In the lower left region, in which the floor region of the receiving area 22 transitions into the border region 24, a spacer 27 is provided in FIG. 5, which generates a spacing of the absorber 25 to the housing 21. The spacer 27 serves, like the spacer 23 shown in FIG. 3, to generate a defined spacing between the absorber 25 and the housing 21. This serves, in particular, to ensure that the adhesive layer, which is applied to the back surface of the absorber prior to its insertion, maintains a defined thickness, and thus, that a positive adhesion is obtained to the greatest possible extent.

The gaps between the absorber 25 and the border region 24 are preferably as small as possible, in order to avoid interferences. For this, in particular, the production of the absorber 25 as an injection molded component is advantageous, because very precise designs and low tolerances can be obtained in injection molding processes. Furthermore, in injection molding processes, in particular, numerous different materials can be used. This allows for an adaptation, in particular, of the absorber 25 to the respective specific required absorption properties.

The embodiment examples shown in FIGS. 2 to 5 are only exemplary, in particular with regard to the material selection, the geometric design, as well as the configuration of the individual elements in relation to one another. Thus, they have no limiting characteristic in this regard.

LIST OF REFERENCE SYMBOLS 01 radar sensor
02 housing
03 absorber made of foam
04 absorber made of foam
05 receiving area
06 border
10 absorber as an injection molded component
11 raised section/rib-like section
12 raised section/rib-like section
13 region having smaller thickness
20 radar sensor
21 housing
22 receiving area
23 spacer
24 border region
25 absorber as an injection molded component
26 raised section/rib-like section
27 spacer

The invention claimed is:

1. A radar sensor for emitting and/or receiving wave-shaped electromagnetic signals comprising:
    at least one housing and at least one absorber,
    wherein the absorber is disposed inside the housing,
    wherein a surface of the absorber has raised, rib-like sections that are disposed adjacent to one another on the surface of the absorber to form a herringbone pattern, wherein the absorber is an injection molded component, and
    wherein the absorber is formed as a plate-shaped element and exhibits a variable thickness along the plate-shaped element.

2. The radar sensor according to claim 1, wherein the radar sensor has a receiving area, which is bordered by an at least partially encompassing border region, wherein the absorber can be placed in the receiving area such that it fits precisely therein.

3. The radar sensor according to claim 1 wherein the raised rib-like sections form a wave-shaped pattern on the surface of the absorber, wherein the wave height between wave peaks and wave troughs disposed adjacently to one another is variable along the course of the pattern.

4. The radar sensor according to claim 3 wherein the wave-shaped pattern has straight raised rib-like sections, which run parallel to one another.

5. The radar sensor according to claim 1 the raised rib-like sections rise from said plate-shaped element in a direction along a surface normal on the plate-shaped element.

6. The radar sensor according to claim 2 wherein the absorber and/or the receiving area exhibits a spacer, wherein the absorber can be positioned in relation to the receiving area by the spacer along an insertion direction and/or a direction transverse to the insertion direction.

7. The radar sensor according to claim 1 wherein the absorber is designed for the absorption of high-frequency waves, wherein high-frequency waves have a frequency of 10 GHz or more.

\* \* \* \* \*